(12) United States Patent
Negishi

(10) Patent No.: US 6,738,805 B2
(45) Date of Patent: May 18, 2004

(54) AUDIO-CONTENTS DEMO SYSTEM CONNECTABLE TO A MOBILE TELEPHONE DEVICE

(75) Inventor: Hiromitsu Negishi, Tokyo (JP)

(73) Assignees: Victor Company of Japan, Ltd., Yokohama (JP); Victor Entertainment, Inc., Tokyo (JP)

(*) Notice: Subject to any disclaimer, the term of this patent is extended or adjusted under 35 U.S.C. 154(b) by 424 days.

(21) Appl. No.: 09/852,661

(22) Filed: May 11, 2001

(65) Prior Publication Data

US 2001/0049278 A1 Dec. 6, 2001

(30) Foreign Application Priority Data

May 24, 2000 (JP) ........................................ 2000-153587
Mar. 30, 2001 (JP) ........................................ 2001-101466

(51) Int. Cl.[7] .............................................. G06F 13/00
(52) U.S. Cl. ........................ 709/219; 709/206; 709/227
(58) Field of Search ................................ 709/206, 217, 709/219, 225, 227, 228, 328, 329

(56) References Cited

U.S. PATENT DOCUMENTS 5,926,624 A * 7/1999 Katz et al. .................. 709/217
6,014,090 A * 1/2000 Rosen et al. ................. 340/905
6,496,802 B1 * 12/2002 van Zoest et al. ............. 705/14
6,539,395 B1 * 3/2003 Gjerdingen et al. ......... 707/102
6,570,080 B1 * 5/2003 Hasegawa et al. ............ 84/609

FOREIGN PATENT DOCUMENTS

JP        11-164058        6/1999

* cited by examiner

Primary Examiner—Viet D. Vu
(74) Attorney, Agent, or Firm—Louis Woo

(57) ABSTRACT

An audio-contents demo system includes a WWW server, a system server, and a mobile telephone device. The WWW server stores information representing audio contents. The system server can be connected with the WWW server via the Internet. The mobile telephone device can be connected with the system server via either a telephone-Internet connection service or a public telephone network. The mobile telephone device sends a signal of a demo-request toward the system server via the telephone-Internet connection service. In response to the demo-request signal sent from the mobile telephone device, the system server accesses the WWW server and takes out a piece of the audio-contents information from the WWW server via the Internet. The audio-contents information piece corresponds to the demo-request signal sent from the mobile telephone device. The system server sends the audio-contents information piece toward the mobile telephone device via the public telephone network.

12 Claims, 6 Drawing Sheets

AUDIO-CONTENTS DEMO SYSTEM CONNECTABLE TO A MOBILE TELEPHONE DEVICE

BACKGROUND OF THE INVENTION

1. Field of the Invention

This invention relates to a system in which information representing audio contents such as tunes is downloaded into a mobile telephone set, or is offered thereto on a streaming basis for a demo (a trial hearing) of the audio contents. In addition, this invention relates to a system server for an audio-contents demo system. Furthermore, this invention relates to a mobile telephone device usable in an audio-contents demo system.

2. Description of the Related Art

Japanese patent application publication number 11-164058 discloses a portable music selection/viewing system designed to offer a music software selected by a user while utilizing a mobile phone. In the system of Japanese application 11-164058, a distribution center having a server function receives provision of a music software from a record production company. A portable music selection/viewing equipment is connected through a public circuit (a public line network) to the distribution center. The equipment has a main body with a button input portion, a display provided on a main body, and a receiver for music. The equipment requests the music software, which is selected by the user, of the distribution center. The equipment receives the music software from the distribution center. In the equipment, a signal of the sounds of the received music software is outputted to the receiver, and a signal of the words or the like is outputted to the display.

There is a telecommunications service (for example, "i" mode service provided by NTT DoCoMo) for connecting mobile telephone devices to the Internet. In a known system using the telephone Internet connection service, a music distribution center has a first server and a second server. The first server is designed for communications via the Internet while the second server is for communications via a public telephone network. The first server stores data representing telephone numbers which correspond to the respective tunes. The second server is assigned the telephone numbers corresponding to the respective tunes. The second server stores information pieces representing the tunes respectively. The second server stores data representing the correspondence between the telephone numbers and the tunes.

A sequence of steps of operation of the above-mentioned known system is as follows. A mobile telephone device sends a signal of a desired tune to the first server in the music distribution center via the Internet, and requests a telephone number corresponding to the desired tune. The first server returns a signal of the desired-tune-corresponding telephone number to the mobile telephone device via the Internet. The mobile telephone device indicates the signal of the desired-tune-corresponding telephone number on its display. Thus, a user knows the telephone number corresponding to the desired tune. Then, the mobile telephone device is disconnected from the Internet, and is connected with the public telephone network to call the communication opposite party (the second server) having the desired-tune-corresponding telephone number. The second server responds to the call related to the desired-tune-corresponding telephone number, and returns the information piece of the desired tune to the mobile telephone device via the public telephone network. The information piece of the desired tune is downloaded into the mobile telephone device, or is offered thereto on a streaming basis.

The information pieces of the respective tunes which are stored in the second server are of a non-compressed digital-data file format such as a WAV format (a waveform format). When receiving a call from a mobile telephone device via the public telephone network, the second server converts an information piece of a desired tune into an analog signal. The second server returns the analog signal of the desired tune to the mobile telephone device via the public telephone network.

The above-mentioned known system has the following problem. To get an information piece representing a desired tune, the user is required to operate the mobile telephone device through a troublesome sequence of steps. Specifically, the mobile telephone device is operated to access the first server via the Internet to find out the telephone number corresponding to the desired tune. Thereafter, the mobile telephone device is operated to access the second server in response to the telephone number via the public telephone network to get the information piece of the desired tune.

SUMMARY OF THE INVENTION

It is a first object of this invention to provide an improved audio-contents demo system.

It is a second object of this invention to provide an improved system server for an audio-contents demo system.

It is a third object of this invention to provide an improved mobile telephone device usable in an audio-contents demo system.

A first aspect of this invention provides an audio-contents demo system comprising a WWW server storing information representing audio contents; a system server connectable with the WWW server via the Internet; a mobile telephone device connectable with the system server via either a telephone-Internet connection service or a public telephone network; means provided in the mobile telephone device for sending a signal of a demo-request toward the system server via the telephone-Internet connection service; means provided in the system server and responsive to the demo-request signal sent from the mobile telephone device for accessing the WWW server and taking out a piece of the audio-contents information from the WWW server via the Internet, the audio-contents information piece corresponding to the demo-request signal sent from the mobile telephone device; and means provided in the system server for sending the audio-contents information piece toward the mobile telephone device via the public telephone network.

A second aspect of this invention provides a system server comprising first means for providing connection with a WWW server via the Internet, the WWW server storing information representing audio contents; second means for providing connection with a mobile telephone device via either a telephone-Internet connection service or a public telephone network; third means for receiving a signal of a demo-request from the mobile telephone device via the telephone-Internet connection service; fourth means responsive to the demo-request signal received by the third means for accessing the WWW server and taking out a piece of the audio-contents information from the WWW server via the Internet, the audio-contents information piece corresponding to the demo-request signal received by the third means; and fifth means for sending the audio-contents information piece toward the mobile telephone device via the public telephone network.

A third aspect of this invention is based on the second aspect thereof, and provides a system server wherein the fifth means comprises 1) means for expanding the audio-contents information piece into an expanding-resultant signal, and 2) means for sending the expanding-resultant signal toward the mobile telephone device via the public telephone network.

A fourth aspect of this invention provides a system server comprising first means for providing connection with a WWW server via the Internet, the WWW server storing compressed information representing audio contents; second means for providing connection with a mobile telephone device via either a telephone-Internet connection service or a public telephone network; third means for receiving a signal of a demo-request from the mobile telephone device via the telephone-Internet connection service; fourth means responsive to the demo-request signal received by the third means for accessing the WWW server and taking out a piece of the audio-contents compressed information from the WWW server via the Internet, the audio-contents compressed information piece corresponding to the demo-request signal received by the third means; fifth means for deciding whether or not the mobile telephone device has an information expanding function on the basis of the demo-request signal received by the third means; sixth means for, in cases where the fifth means decides that the mobile telephone device has not the information expanding function, expanding the audio-contents compressed information piece into an expanding-resultant signal; seventh means for sending the expanding-resultant signal toward the mobile telephone device via the public telephone network; and eighth means for, in cases where the fifth means decides that the mobile telephone device has the information expanding function, sending the audio-contents compressed information piece toward the mobile telephone device via the telephone-Internet connection service.

A fifth aspect of this invention provides a mobile telephone device in an audio-contents demo system comprising a WWW server storing information representing audio contents and a system server connectable with the WWW server via the Internet. The mobile telephone device comprises first means for providing connection with the system server via either a telephone-Internet connection service or a public telephone network; second means for sending a signal of a demo-request toward the system server via the telephone-Internet connection service; third means for receiving a signal of audio contents from the system server via the public telephone network, the audio-contents signal being responsive to the demo-request signal; and fourth means for playing back the audio contents represented by the signal received by the third means.

A sixth aspect of this invention provides an audio-contents demo system comprising a WWW server storing information representing audio contents; a system server connectable with the WWW server via the Internet; a mobile telephone device connectable with the system server via either a telephone-Internet connection service or a public telephone network; means provided in the mobile telephone device for sending a signal of a demo-request and an ID signal toward the system server via the telephone-Internet connection service, the ID signal being assigned to the mobile telephone device; means provided in the system server for storing registered ID signals; means provided in the system server for deciding whether or not the ID signal sent from the mobile telephone device is equal to one of the registered ID signals; means provided in the system server and responsive to the demo-request signal sent from the mobile telephone device for, only in cases where the ID signal sent from the mobile telephone device is equal to one of the registered ID signals, accessing the WWW server and taking out a piece of the audio-contents information from the WWW server via the Internet, the audio-contents information piece corresponding to the demo-request signal sent from the mobile telephone device; means provided in the system server for filtering the audio-contents information piece into a filtering-resultant signal according to a filtering characteristic determined by the ID signal sent from the mobile telephone device; and means provided in the system server for sending the filtering-resultant signal toward the mobile telephone device via the public telephone network.

A seventh aspect of this invention is based on the sixth aspect thereof, and provides an audio-contents demo system further comprising means provided in the system server for performing authentication with respect to the mobile telephone device in response to the ID signal sent therefrom.

An eighth aspect of this invention provides a system server comprising first means for providing connection with a WWW server via the Internet, the WWW server storing information representing audio contents; second means for providing connection with a mobile telephone device via either a telephone-Internet connection service or a public telephone network; third means for receiving a signal of a demo-request and an ID signal from the mobile telephone device via the telephone-Internet connection service, the ID signal being assigned to the mobile telephone device; fourth means for storing registered ID signals; fifth means for deciding whether or not the ID signal received by the third means is equal to one of the registered ID signals stored by the fourth means; sixth means responsive to the demo-request signal received by the third means for, only in cases where the fifth means decides that the ID signal received by the third means is equal to one of the registered ID signals stored by the fourth means, accessing the WWW server and taking out a piece of the audio-contents information from the WWW server via the Internet, the audio-contents information piece corresponding to the demo-request signal received by the third means; and seventh means for sending the audio-contents information piece toward the mobile telephone device via the public telephone network.

A ninth aspect of this invention is based on the eighth aspect thereof, and provides a system server wherein the seventh means comprises 1) means for expanding the audio-contents information piece into an expanding-resultant signal, 2) means for filtering the expanding-resultant signal into a filtering-resultant signal according to a filtering characteristic determined by the ID signal received by the third means, and 3) means for sending the filtering-resultant signal toward the mobile telephone device via the public telephone network.

A tenth aspect of this invention provides a system server comprising first means for providing connection with a WWW server via the Internet, the WWW server storing compressed information representing audio contents; second means for providing connection with a mobile telephone device via either a telephone-Internet connection service or a public telephone network; third means for receiving a signal of a demo-request and an ID signal from the mobile telephone device via the telephone-Internet connection service, the ID signal being assigned to the mobile telephone device; fourth means for storing registered ID signals; fifth means for deciding whether or not the ID signal received by the third means is equal to one of the registered ID signals stored by the fourth means; sixth means responsive to the demo-request signal received by the third means for, only in cases where the fifth means decides that the ID signal received by the third means is equal to one of the registered ID signals stored by the fourth means, accessing the WWW server and taking out a piece of the audio-contents compressed information from the WWW server via the Internet, the audio-contents compressed information piece corresponding to the demo-request signal received by the third means; seventh means for deciding whether or not the mobile telephone device has an information expanding function on the basis of the ID signal received by the third means; eighth means for, in cases where the seventh means decides that the mobile telephone device has not the information expanding function, expanding the audio-contents compressed information piece into an expanding-resultant signal; ninth means for sending the expanding-resultant signal toward the mobile telephone device via the public telephone network; and tenth means for, in cases where the seventh means decides that the mobile telephone device has the information expanding function, sending the audio-contents compressed information piece toward the mobile telephone device via the telephone-Internet connection service.

An eleventh aspect of this invention provides an audio-contents demo system comprising a WWW server storing information representing audio contents; a system server connectable with the WWW server via the Internet; a mobile telephone device connectable with the system server via either a telephone-Internet connection service or a public telephone network; means provided in the mobile telephone device for sending a signal of a demo-request and an ID signal toward the system server via the telephone-Internet connection service, the ID signal being assigned to the mobile telephone device; means provided in the system server for storing registered ID signals; means provided in the system server for deciding whether or not the ID signal sent from the mobile telephone device is equal to one of the registered ID signals; means provided in the system server and responsive to the demo-request signal sent from the mobile telephone device for, only in cases where the ID signal sent from the mobile telephone device is equal to one of the registered ID signals, accessing the WWW server and taking out a piece of the audio-contents information from the WWW server via the Internet, the audio-contents information piece corresponding to the demo-request signal sent from the mobile telephone device; and means provided in the system server for sending a signal of a telephone number toward the mobile telephone device via the public telephone network, the telephone number corresponding to the audio-contents information piece.

A twelfth aspect of this invention provides a system server comprising first means for providing connection with a WWW server via the Internet, the WWW server storing compressed information representing audio contents; second means for providing connection with a mobile telephone device via either a telephone-Internet connection service or a public telephone network; third means for receiving a signal of a demo-request and an ID signal from the mobile telephone device via the telephone-Internet connection service, the ID signal being assigned to the mobile telephone device; fourth means for storing registered ID signals; fifth means for deciding whether or not the ID signal received by the third means is equal to one of the registered ID signals stored by the fourth means; sixth means responsive to the demo-request signal received by the third means for, only in cases where the fifth means decides that the ID signal received by the third means is equal to one of the registered ID signals stored by the fourth means, accessing the WWW server and taking out a piece of the audio-contents compressed information from the WWW server via the Internet, the audio-contents compressed information piece corresponding to the demo-request signal received by the third means; seventh means for deciding whether or not the mobile telephone device has an information expanding function on the basis of the ID signal received by the third means; eighth means for, in cases where the seventh means decides that the mobile telephone device has not the information expanding function, sending a signal of a telephone number toward the mobile telephone device via the public telephone network, the telephone number corresponding to the audio-contents compressed information piece; and ninth means for, in cases where the seventh means decides that the mobile telephone device has the information expanding function, sending the audio-contents compressed information piece toward the mobile telephone device via the telephone-Internet connection service.

DETAILED DESCRIPTION OF THE INVENTION

First Embodiment

Figure 1:
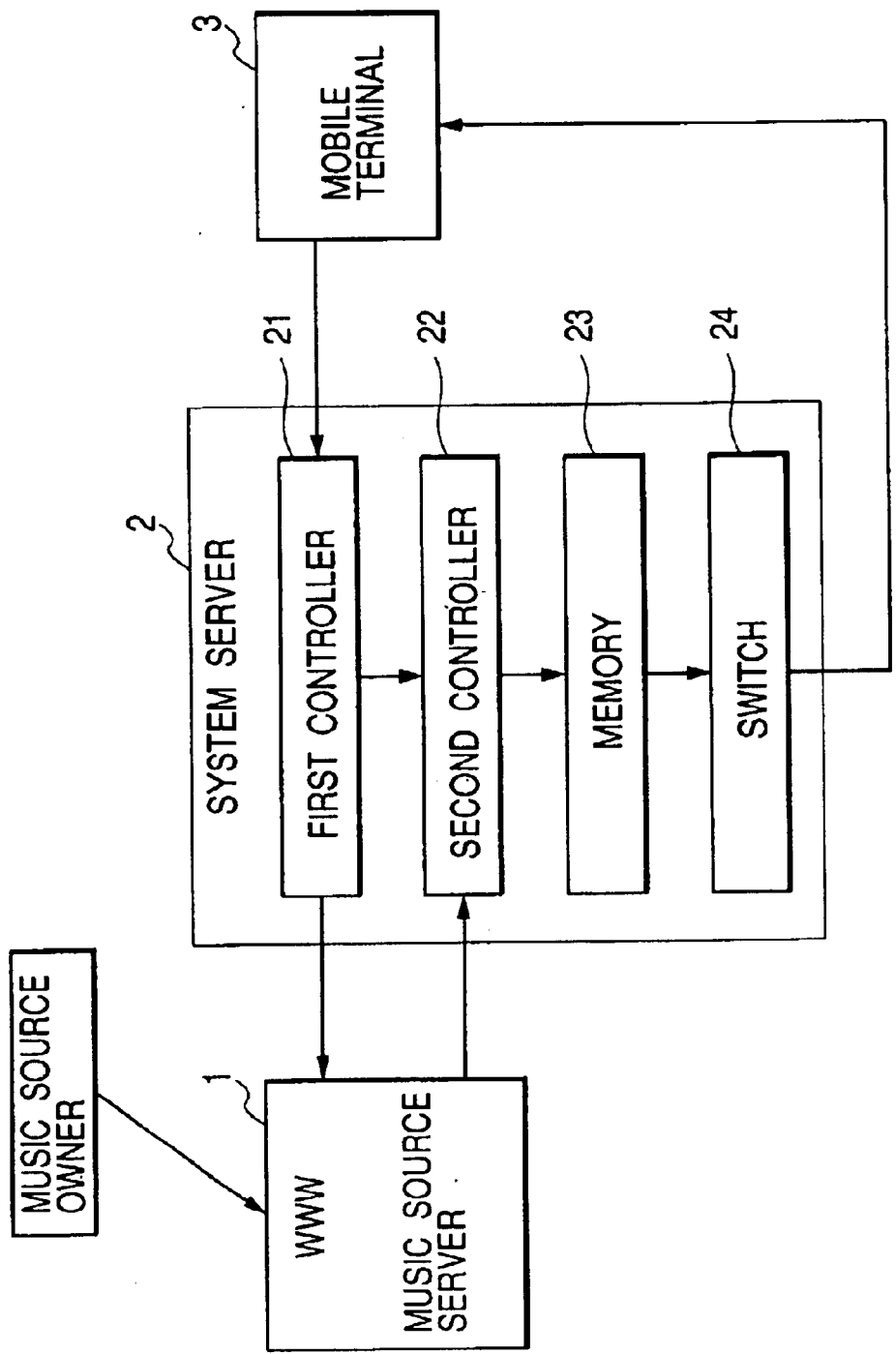
FIG. 1 is a block diagram of an audio-contents demo system according to a first embodiment of this invention.

FIG. 1 shows an audio-contents demo system according to a first embodiment of this invention. Here, "demo" means "trial hearing" or "audition". The system of FIG. 1 includes one or more WWW music source servers 1, a system server 2, and mobile terminals (mobile telephone devices) 3. Only one of the music source servers 1 and only one of the mobile terminals 3 are shown in FIG. 1. The music source server 1 is possessed by a music source owner such as a record company. The music source server 1 and the system server 2 are connected with each other via an IP-based line (an Internet-protocol-based line or the Internet). The music source server 1 and the system server 2 may be connected with each other via an exclusive line. The system server 2 and the mobile terminal 3 can be connected with each other by telephone-Internet connection service (for example, "i" mode service provided by NTT DoCoMo) or via a public telephone network.

The music source server 1 stores digital information pieces representing audio contents. The right to distribute the audio contents is held by the music source owner. The audio contents include, for example, tunes. First ones among the information pieces of the audio contents are of a compressed file format such as a "ram" file format, a "ra" file format (a RealAudio file format), a WMT file format (a Windows Media Technology file format), or a QT file format (a QuickTime file format). Second ones among the information pieces of the audio contents are of a non-compressed file format such as a WAV file format (a waveform file format). Accordingly, in the music source server 1, there are compressed and non-compressed files having the information pieces of the audio contents (the tunes). The music source server 1 stores data representing a table usable in searching the audio contents for a desired tune. The files and the table in the music source server 1 can be accessed externally (accessed from an external) via the Internet.

The system server 2 includes a first computer-based controller 21, a second computer-based controller 22, a memory 23, and a computer-based switch 24. The first controller 21 is connected to the second controller 22. The second controller 22 is connected to the memory 23. The memory 23 is connected to the switch 24.

The first controller 21 in the system server 2 has an interface for communications via the Internet, a memory storing a computer program, and a processor connected to the interface and the memory. The interface is used for communications with the music source server 1 and the mobile terminal 3. The first controller 21 (the processor in the first controller 21) operates in accordance with the computer program. The computer program is designed to cause the first controller 21 to implement steps of operation which will be mentioned later.

The first controller 21 receives a signal of a demo request for a desired tune from the mobile terminal 3 via the Internet on a packet communication basis. The first controller 21 decodes the received demo-request signal, thereby getting data to identify the desired tune and data of the telephone number assigned to the mobile terminal 3. The first controller 21 outputs the data of the telephone number to the second controller 22. The first controller 21 accesses the table in the music source server 1 via the Internet, and searches the audio contents in the music source server 1 for the desired tune by referring to the table. When the desired tune is found, the first controller 21 sends a signal to the music source server 1 which requires the transmission of the file of the desired tune.

The music source server 1 has an interface for communications via the Internet, a memory storing a computer program, a storage unit storing the files of the audio contents, and a processor connected to the interface, the memory, and the storage unit. The interface is used for communications with the system server 2. The music source server 1 (the processor in the music source server 1) operates in accordance with the computer program. The computer program is designed to cause the music source server 1 to implement steps of operation which will be mentioned later.

The music source server 1 receives the file-transmission requirement signal from the first controller 21 in the system server 2 via the Internet. The music source server 1 selects the file of the desired tune from among the stored files in response to the file-transmission-requirement signal. The music source server 1 sends the file of the desired tune to the system server 2 via the Internet.

The second controller 22 in the system server 2 has an interface for communications via the Internet, a memory storing a computer program, and a processor connected to the interface and the memory. The interface is used for communications with the music source server 1. The second controller 22 (the processor in the second controller 22) operates in accordance with the computer program. The computer program is designed to cause the second controller 21 to implement steps of operation which will be mentioned later.

The second controller 22 receives the file of the desired tune from the music source server 1 via the Internet. The second controller 22 derives an attribute-indicating signal from the desired-tune file. The second controller 22 decides whether the desired-tune file is of the compressed type or the non-compressed type on the basis of the attribute-indicating signal. The second controller 22 decides whether or not the mobile terminal 3 can handle a compressed file on the basis of the data of the telephone number assigned to the mobile terminal 3. In the case where the received file of the desired tune is of the compressed type and the mobile terminal 3 can not handle a compressed file, the second controller 22 expands the received file into a non-compressed file of the desired tune. Then, the second controller 22 stores the non-compressed file of the desired tune into the memory 23. In the case where the received file of the desired tune is of the compressed type and the mobile terminal 3 can handle a compressed file, the second controller 22 stores the received file of the desired tune into the memory 23 as it is. In the case where the received file of the desired tune is of the non-compressed type and the mobile terminal 3 can not handle a compressed file, the second controller 22 stores the received file of the desired tune into the memory 23 as it is. In the case where the received file of the desired tune is of the non-compressed type and the mobile terminal 3 can handle a compressed file, the second controller 22 compresses the received file into a compressed file of the desired tune. Then, the second controller 22 stores the compressed file of the desired tune into the memory 23.

The switch 24 in the system server 2 has a first interface for communications via the Internet, a second interface for communications via the public telephone network, a memory storing a computer program, and a processor connected to the first and second interfaces and the memory. The first and second interfaces are used for communications with the mobile terminal 3. The switch 24 (the processor in the switch 24) operates in accordance with the computer program. The computer program is designed to cause the switch 24 to implement steps of operation which will be mentioned later.

The interface in the first controller 21, the interface in the second controller 22, and the first interface in the switch 24 use a common interface. Alternatively, the interface in the first controller 21, the interface in the second controller 22, and the first interface in the switch 24 may be separate from each other.

The switch 24 accesses the desired-tune file in the memory 23. As previously mentioned, the desired-tune file is of either the compressed type or the non-compressed type. The switch 24 derives an attribute-indicating signal from the desired-tune file. The switch 24 decides whether the desired-tune file is of the compressed type or the non-compressed type on the basis of the attribute-indicating signal. In the case where the desired-tune file is of the compressed type, the switch 24 sends the desired-tune file to the mobile terminal 3 via the Internet on a packet communication basis. In this case, the connection between the system server 2 and the mobile terminal 3 is continuously maintained during a time interval including a stage of the transmission of the demo-request signal and a stage of the transmission of the desired-tune file. In the case where the desired-tune file is of the non-compressed type, the switch 24 changes the connection with the mobile terminal 3 from the Internet type to the public-telephone-network type. Then, the switch 24 converts the desired-tune file into an analog signal of the desired tune. The switch 24 sends the analog signal of the desired-tune to the mobile terminal 3 via the public telephone network.

Figure 2:
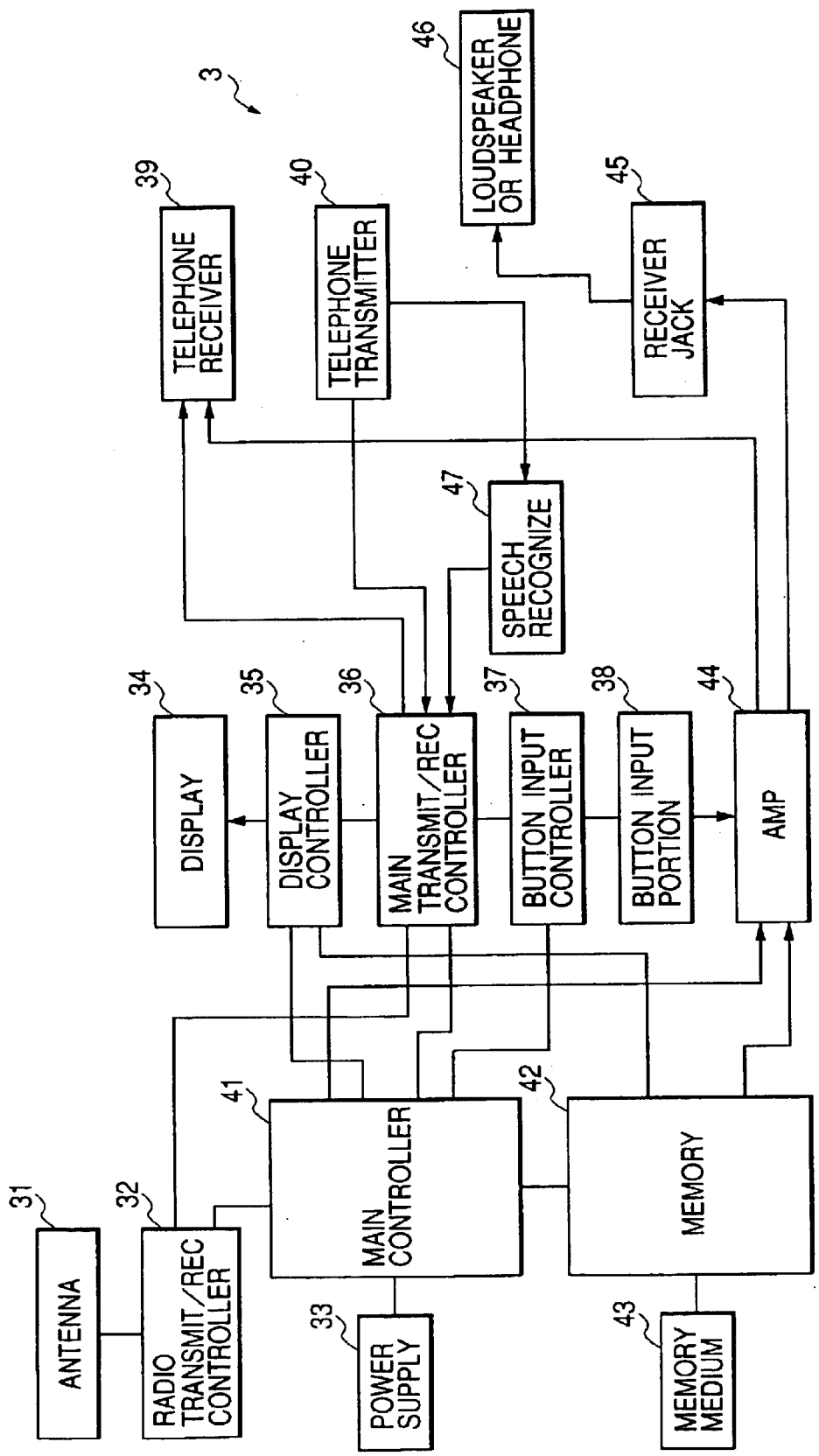
FIG. 2 is a block diagram of a mobile terminal in FIG. 1.

As shown in FIG. 2, the mobile terminal 3 includes an antenna 31, a radio transmission/reception controller 32, a detachable power supply 33, a display 34, a display controller 35, a main transmission/reception controller 36, a button input controller 37, a button input portion 38, a telephone receiver (a loudspeaker) 39, and a telephone transmitter (a microphone) 40 which are used for communications via the public telephone network and communications via the telephone-Internet connection service. The mobile terminal 3 includes a main controller 41, a memory 42, a detachable memory medium 43, an amplifier 44, a receiver jack 45, and a speech recognition controller 47 which are used for a demo of audio contents such as a tune or tunes. An external loudspeaker or headphone 46 can be connected to the receiver jack 45.

The antenna 31 is connected to the radio transmission/reception controller 32. The radio transmission/reception controller 32 is connected to the main transmission/reception controller 36 and the main controller 41. The display 34 is connected to the display controller 35. The display controller 35 is connected to the main transmission/reception controller 36, the main controller 41, the memory 42. The main transmission/reception controller 36 is connected to the button input controller 37, the telephone receiver 39, the telephone transmitter 40, the main controller 41, and the speech recognition controller 47. The button input controller 37 is connected to the button input portion 38 and the main controller 41. The button input portion 38 is connected to the amplifier 44. The telephone receiver 39 is connected to the amplifier 44. The telephone transmitter 40 is connected to the speech recognition controller 47. The main controller 41 is connected to the memory 42 and the amplifier 44. The memory 42 is connected to the memory medium 43 and the amplifier 44. The amplifier 44 is connected to the receiver jack 45. The power supply 33 feeds electric power to portions of the mobile terminal 3.

The main controller 41 includes a computer. The main controller 41 (the computer in the main controller 41) operates in accordance with a computer program stored in its internal memory. The computer program is designed to cause the main controller 41 to implement steps of operation which will be mentioned later.

The telephone transmitter 40 converts user's voice of a demo request for a desired tune into a corresponding electric signal. The telephone transmitter 40 outputs the electric signal to the speech recognition controller 47. The speech recognition controller 47 subjects the output signal of the telephone transmitter 40 to speech recognition. The result of the speech recognition contains data to identify the desired tune. The speech recognition controller 47 informs the main transmission/reception controller 36 of the result of the speech recognition. A signal representing a telephone number assigned to the mobile terminal 3 is provided in the main transmission/reception controller 36. The main transmission/reception controller 36 generates a baseband signal of the demo request for the desired tune in response to the speech recognition result and the telephone number signal. The baseband demo-request signal contains the telephone number signal and also the data to identify the desired tune. The main transmission/reception controller 36 outputs the baseband demo-request signal to the radio transmission/reception controller 32. The radio transmission/reception controller 32 converts the baseband demo-request signal into a radio-frequency demo-request signal. The radio transmission/reception controller 32 feeds the radio-frequency demo-request signal to the antenna 31. The antenna 31 radiates the radio-frequency demo-request signal. A corresponding demo-request signal is transmitted to the system server 2 (see FIG. 1) by the telephone-Internet connection service.

The antenna 31 catches a radio-frequency signal containing a file of a desired tune or an analog signal of the desired tune. The radio-frequency signal is transmitted to the mobile terminal 3 by the telephone-Internet connection service or via the public telephone network. The antenna 31 feeds the radio-frequency signal to the radio transmission/reception controller 32. The radio transmission/reception controller 32 demodulates the radio-frequency signal into the file of the desired tune or the analog signal of the desired tune. The radio transmission/reception controller 32 outputs the file of the desired tune or the analog signal of the desired tune to the main controller 41. In the case where the file of the desired tune is outputted from the radio transmission/reception controller 32, the main controller 41 operates as follows. The main controller 41 expands the desired-tune file into a non-compressed file of the desired tune. The main controller 41 changes the non-compressed file of the desired tune into an analog signal of the desired tune. The main controller 41 outputs the analog signal of the desired tune to the amplifier 44. The main controller 41 extracts picture information and text information from the desired-tune file. The main controller 41 outputs the picture information and the text information to the display controller 35. In the case where the analog signal of the desired tune is outputted from the radio transmission/reception controller 32, the main controller 41 passes the analog signal of the desired tune to the amplifier 44. The device 44 amplifies the desired-tune signal. The amplification-resultant desired-tune signal is fed from the amplifier 44 to the loudspeaker or headphone 46 so that a demo of the desired tune is available to the user. The display controller 35 drives the display 34 in response to the picture information and the text information. The display 34 indicates the picture information and the text information.

The system of FIG. 1 has the following advantages. A demo of a desired tune is implemented by operating the mobile terminal 3 through a simple sequence of steps. The music source server 1 can store information pieces of respective tunes as compressed files. Accordingly, it is possible to save the memory capacity in the music source server 1.

Second Embodiment

A second embodiment of this invention is similar to the first embodiment thereof except for an additional design mentioned below. The second embodiment of this invention includes an accounting system. The business company providing the public telephone network collects fees for desired-tune demos from users. The business company providing the public telephone network sends the collected fees to the business companies having the music source server 1 and the system server 2. The business company having the music source server 1 pays copyright fees to copyright holders related to the audio contents (the tunes).

Third Embodiment

A third embodiment of this invention is similar to the first embodiment thereof except for a design change mentioned below. In the third embodiment of this invention, audio contents are voices corresponding to news and weather forecasts.

Fourth Embodiment

Figure 3:
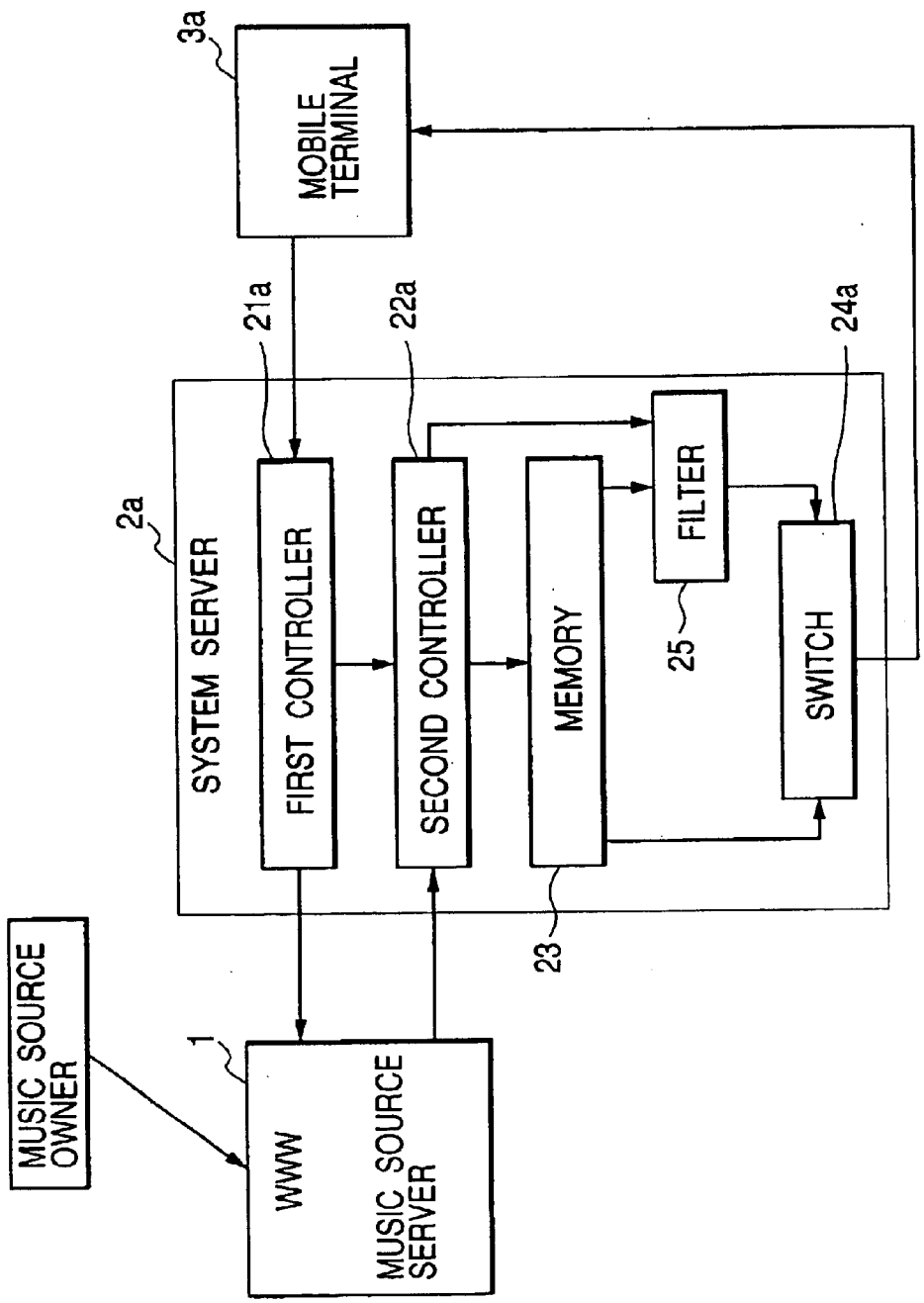
FIG. 3 is a block diagram of an audio-contents demo system according to a fourth embodiment of this invention.

FIG. 3 shows an audio-contents demo system according to a fourth embodiment of this invention. The system of FIG. 3 is similar to the system of FIG. 1 except for design changes mentioned hereinafter. The system of FIG. 3 includes a system server 2a and a mobile terminal 3a instead of the system server 2 and the mobile terminal 3 (see FIG. 1) respectively. The system server 2a includes first and second controllers 21a and 22a instead of the first and second controllers 21 and 22 (see FIG. 1) respectively. The system sever 2a includes a switch 24a instead of the switch 24 (see FIG. 1). The first controller 21a is modified from the first controller 21 as will be made clear later. The second controller 22a is modified from the second controller 22 as will be made clear later. The switch 24a is modified from the switch 24 as will be made clear later. The system server 2a includes a filtering circuit 25 connected between the memory 23 and the switch 24a. The filtering circuit 25 is also connected to the second controller 22a. The mobile terminal 3a is modified from the mobile terminal 3 as will be made clear later.

Terminal ID (identification) signals are assigned to mobile terminals, respectively. The terminal ID signals are also called user ID signals or subscriber ID signals. Examples of the terminal ID signals are "Dzef3kF47das", "Ze4SdeSan25", and "05001050006664aa.ezweb.ne.jp".

The first controller 21a in the system server 2a stores the terminal ID signals (the registered terminal ID signals) of registered mobile terminals which are permitted to access the system server 2a.

The mobile terminal 3a stores the terminal ID signal assigned thereto. The mobile terminal 3a generates a signal of a demo request for a desired tune which contains the terminal ID signal, data of the telephone number assigned thereto, and data to identify the desired tune. The mobile station 3a transmits the demo-request signal to the system server 2a via the Internet on a packet communication basis.

The first controller 21a in the system server 2a receives the demo-request signal. The first controller 21a decodes the received demo-request signal, thereby getting the data to identify the desired tune, the data of the telephone number assigned to the mobile terminal 3a, and the terminal ID signal (the received terminal ID signal) assigned to the mobile terminal 3a. The first controller 21a implements authentication with respect to the mobile terminal 3a sending the present demo-request signal. Specifically, the first controller 21a collates the received terminal ID signal with the registered terminal ID signals. The first controller 21a decides whether or not the received terminal ID signal is equal to one of the registered terminal ID signals. When the received terminal ID signal is equal to none of the registered terminal ID signals, the first controller 21a refuses the present demo request. When the received terminal ID signal is equal to one of the registered terminal ID signals, the first controller 21a grants the present demo request. In this case, the first controller 21a operates as follows. The first controller 21a outputs the received terminal ID signal and the data of the telephone number to the second controller 22a. The first controller 21a accesses the table in the music source server 1 via the Internet, and searches the audio contents in the music source server 1 for the desired tune by referring to the table. When searching for the desired tune, the first controller 21a sends a signal to the music source server 1 which requires the transmission of the file of the desired tune.

The second controller 22a in the system server 2a receives the file of the desired tune from the music source server 1 via the Internet. The second controller 22a decides whether or not the mobile terminal 3a can handle a compressed file on the basis of at least one of the received terminal ID signal and the data of the telephone number assigned to the mobile terminal 3a. In the case where the received file of the desired tune is of the compressed type and the mobile terminal 3a can not handle a compressed file, the second controller 22a expands the received file into a non-compressed file of the desired tune. Then, the second controller 22a stores the non-compressed file of the desired tune into the memory 23. In the case where the received file of the desired tune is of the compressed type and the mobile terminal 3a can handle a compressed file, the second controller 22a stores the received file of the desired tune into the memory 23 as it is. In the case where the received file of the desired tune is of the non-compressed type and the mobile terminal 3a can not handle a compressed file, the second controller 22a stores the received file of the desired tune into the memory 23 as it is. In the case where the received file of the desired tune is of the non-compressed type and the mobile terminal 3a can handle a compressed file, the second controller 22a compresses the received file into a compressed file of the desired tune. Then, the second controller 22a stores the compressed file of the desired tune into the memory 23.

The switch 24a accesses the desired-tune file in the memory 23. As previously mentioned, the desired-tune file is of either the compressed type or the non-compressed type. The switch 24a derives an attribute-indicating signal from the desired-tune file. The switch 24a decides whether the desired-tune file is of the compressed type or the non-compressed type on the basis of the attribute-indicating signal. In the case where the desired-tune file is of the compressed type, the switch 24a sends the desired-tune file to the mobile terminal 3a via the Internet on a packet communication basis. In this case, the connection between the system server 2a and the mobile terminal 3a is continuously maintained during a time interval including a stage of the transmission of the demo-request signal and a stage of the transmission of the desired-tune file. In the case where the desired-tune file is of the non-compressed type, the switch 24a controls the memory 23 to output the desired-tune file to the filtering circuit 25. The filtering circuit 25 subjects the desired-tune file to an equalizing process to generate an equalizing-resultant signal of the desired tune. The filtering circuit 25 outputs the equalizing-resultant signal to the switch 24a. The switch 24a changes the connection with the mobile terminal 3a from the Internet type to the public-telephone-network type. Then, the switch 24a converts the equalizing-resultant signal into an analog signal of the desired tune. The switch 24a sends the analog signal of the desired-tune to the mobile terminal 3a via the public telephone network. Alternatively, the switch 24a may send a signal of a telephone number corresponding to the desired tune. In this case, the telephone number is indicated by the display of the mobile terminal 3a.

The filtering circuit 25 includes a group of filters having different filtering characteristics (different equalizing characteristics) respectively. The equalizing characteristics of the filters are predetermined according to types of mobile terminals. The second controller 22a selects one from among the filters in the filtering circuit 25 in response to the received terminal ID signal. The selected filter has an equalizing characteristic suited for the mobile terminal 3a. The selected filter is used in processing the desired-tune file into the equalizing-resultant signal.

Fifth Embodiment

Figure 4:
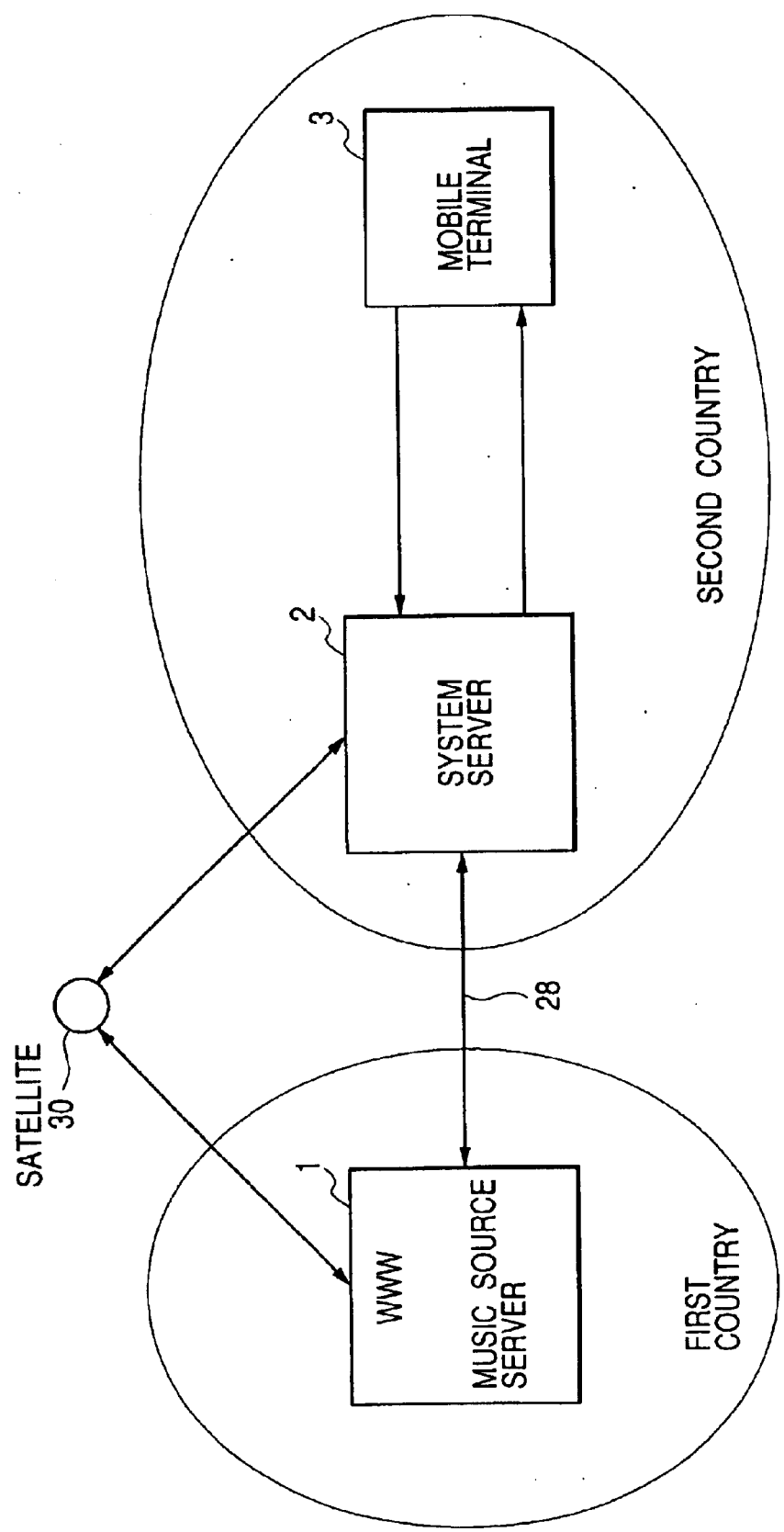
FIG. 4 is a block diagram of an audio-contents demo system according to a fifth embodiment of this invention.

FIG. 4 shows an audio-contents demo system according to a fifth embodiment of this invention. The system of FIG. 4 is similar to the system of FIG. 1 except for design changes mentioned hereinafter.

In the system of FIG. 4, the music source server 1 is located in a first country while the system server 2 and the mobile terminal 3 are located in a second country different from the first country. The music source server 1 and the system server 2 can be connected with each other via an exclusive line 28 including a submarine cable. The music source server 1 and the system server 2 can also be connected via a communication path including a communication satellite 30.

With respect to accounting processes for demos of desired tunes, the system server 2 acts for the music source server 1.

Sixth Embodiment

Figure 5:
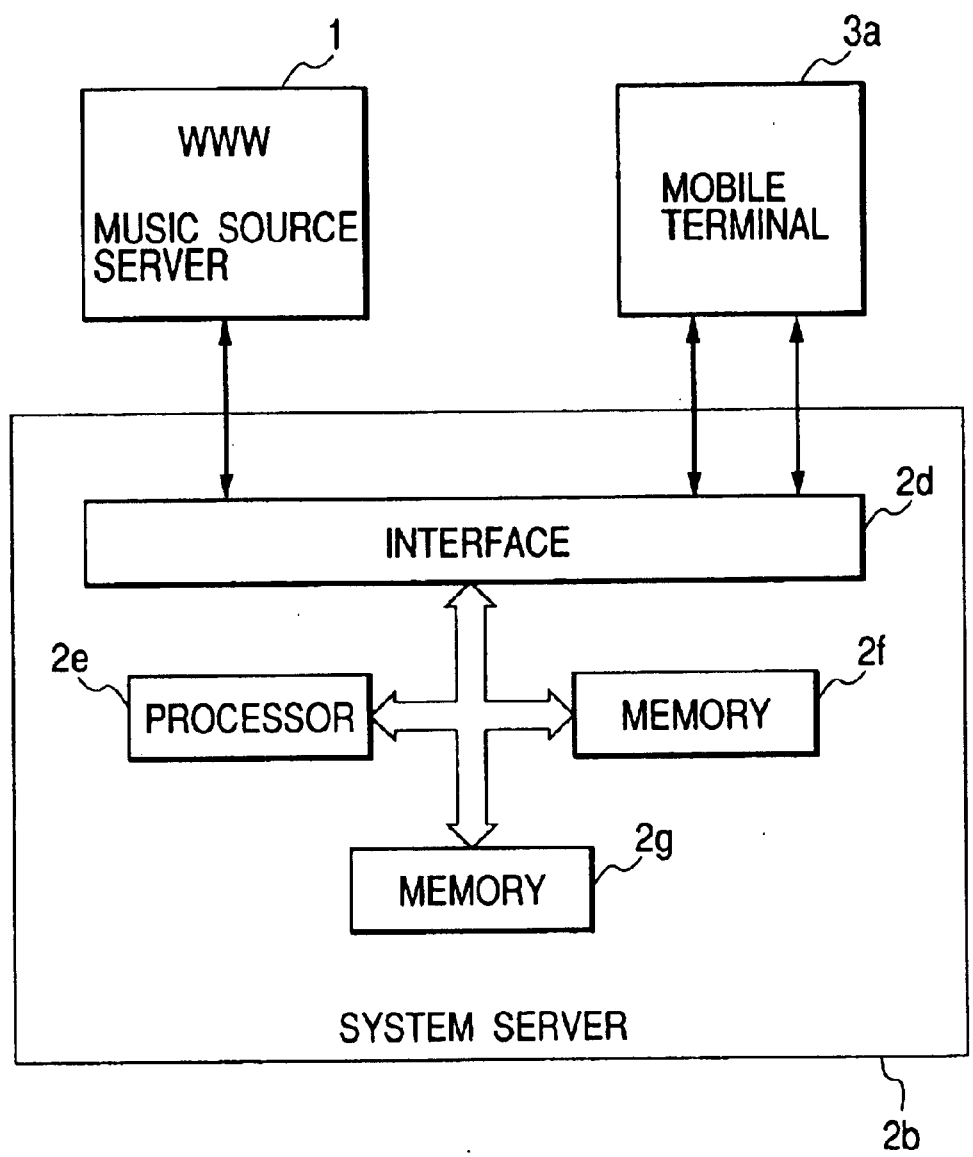
FIG. 5 is a block diagram of an audio-contents demo system according to a sixth embodiment of this invention.

FIG. 5 shows an audio-contents demo system according to a sixth embodiment of this invention. The system of FIG. 5 is similar to the system of FIG. 3 except for design changes mentioned hereinafter. The system of FIG. 5 includes a system server 2b instead of the system server 2a (see FIG. 3).

The system server 2b includes a computer having a combination of an interface 2d, a processor 2e, a first memory 2f, and a second memory 2g. The first memory 2f stores information representing a computer program. The system server 2b (the processor 2e in the system server 2b) operates in accordance with the computer program. During operation of the system server 2b, the second memory 2g is used as a working storage.

The first memory 2f also stores the terminal ID signals (the registered terminal ID signals) of registered mobile terminals which are permitted to access the system server 2b. The first memory 2f further stores information representing a table providing the relation between a terminal ID signal and an equalizing characteristic.

The interface 2d has a first section for communications via the Internet, and a second section for communications via the public telephone network. The first section in the interface 2d is used for communications with the music source server 1 and the mobile terminal 3a. The second section in the interface 2d is used for communications with the mobile terminal 3a.

A demo-request signal can be transmitted from the mobile terminal 3a to the system server 2a via the Internet on a packet communication basis. The system server 2a and the music source server 1 can communicate with each other via the Internet. A signal of a desired file can be transmitted from the system server 2a to the mobile terminal 3a via the Internet on a packet communication basis or via the public telephone network.

Figure 6:
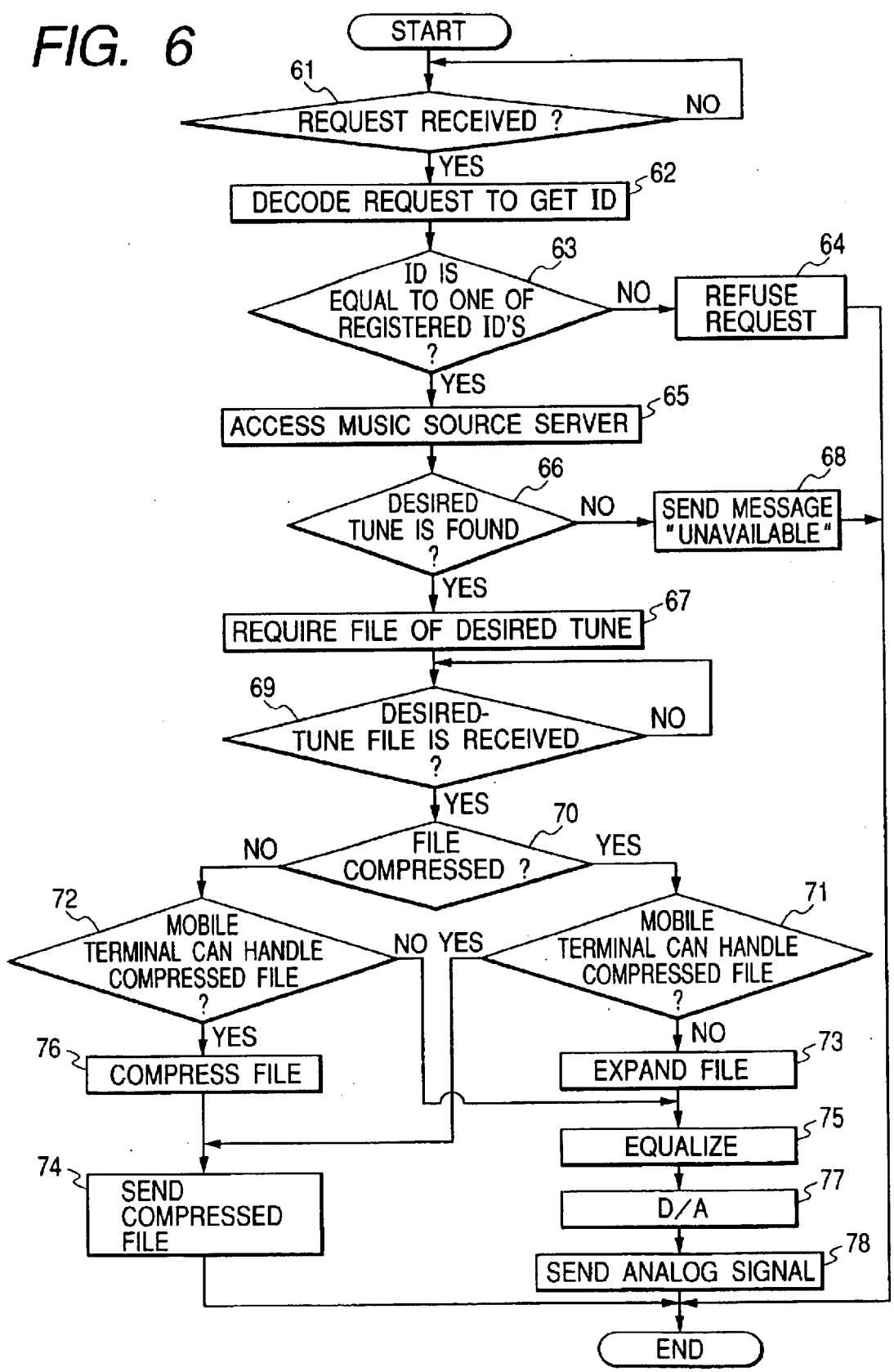
FIG. 6 is a flowchart of a segment of a control program for a system server in FIG. 5.

FIG. 6 is a flowchart of a segment of the computer program in the system server 2b. As shown in FIG. 6, a first step 61 of the program segment decides whether or not a demo-request signal from the mobile terminal 3a has been received. When a demo-request signal has been received, the program advances from the step 61 to a step 62. Otherwise, the step 61 is repeated.

The step 62 decodes the received demo-request signal, thereby getting data to identify a desired tune, data of the telephone number assigned to the mobile terminal 3a, and a terminal ID signal (a received terminal ID signal) assigned to the mobile terminal 3a.

A step 63 following the step 62 collates the received terminal ID signal with the registered terminal ID signals. The step 63 decides whether or not the received terminal ID signal is equal to one of the registered terminal ID signals.

When the received terminal ID signal is equal to none of the registered terminal ID signals, the program advances from the step 63 to a step 64. When the received terminal ID signal is equal to one of the registered terminal ID signals, the program advances from the step 63 to a step 65.

The step 64 implements signal processing for refusing the demo request related to the received demo-request signal. After the step 64, the current execution cycle of the program segment ends. Then, the program segment restarts from the step 61.

The step 65 accesses the table in the music source server 1 via the Internet, and searches the audio contents in the music source server 1 for the desired tune by referring to the table.

A step 66 subsequent to the step 65 decides whether or not the desired tune has been successfully found. When the desired tune has been successfully found, the program advances from the step 66 to a step 67. Otherwise, the program advances from the step 66 to a step 68.

The step 68 sends a signal representative of a message "unavailable" to the mobile terminal 3a via the Internet. Thus, the mobile terminal 3a is informed that the desired tune is unavailable.

After the step 68, the current execution cycle of the program segment ends. Then, the program segment restarts from the step 61.

The step 67 sends a signal to the music source server 1 which requires the transmission of the file of the desired tune.

A step 69 following the step 67 decides whether or not the file of the desired tune from the music source server 1 has been received. When the file of the desired tune has been received, the program advances from the step 69 to a step 70. Otherwise, the step 69 is repeated.

The step 70 derives an attribute-indicating signal from the desired-tune file. The step 70 decides whether the desired-tune file is of the compressed type or the non-compressed type on the basis of the attribute-indicating signal. When the desired-tune file is of the compressed type, the program advances from the step 70 to a step 71. When the desired-tune file is of the non-compressed type, the program advances from the step 70 to a step 72.

The step 71 decides whether or not the mobile terminal 3a can handle a compressed file on the basis of at least one of the received terminal ID signal and the data of the telephone number assigned to the mobile terminal 3a. When the mobile terminal 3a can not handle a compressed file, the program advances from the step 71 to a step 73. Otherwise, the program advances from the step 71 to a step 74.

The step 73 expands the received file into a non-compressed file of the desired tune. After the step 73, the program advances to a step 75.

The step 72 decides whether or not the mobile terminal 3a can handle a compressed file on the basis of at least one of the received terminal ID signal and the data of the telephone number assigned to the mobile terminal 3a. When the mobile terminal 3a can not handle a compressed file, the program advances from the step 72 to the step 75. Otherwise, the program advances from the step 72 to a step 76.

The step 76 compresses the received file into a compressed file of the desired tune. After the step 76, the program advances to the step 74.

The step 74 sends the desired-tune file to the mobile terminal 3a via the Internet on a packet communication basis. After the step 74, the current execution cycle of the program segment ends. Then, the program segment restarts from the step 61.

The step 75 determines the equalizing characteristic in accordance with the received terminal ID signal. The step 75 subjects the desired-tune file to an equalizing process with the determined equalizing characteristic to generate an equalizing-resultant signal of the desired tune.

A step 77 following the step 75 converts the equalizing-resultant signal into an analog signal of the desired tune.

A step 78 subsequent to the step 77 changes the connection with the mobile terminal 3a from the Internet type to the public-telephone-network type. Then, the step 78 sends the analog signal of the desired-tune to the mobile terminal 3a via the public telephone network. After the step 78, the current execution cycle of the program segment ends. Then, the program segment restarts from the step 61.

What is claimed is:

1. An audio-contents demo system comprising:
   a WWW server storing information representing audio contents;
   a system server connectable with the WWW server via the Internet;
   a mobile telephone device connectable with the system server via either a telephone-Internet connection service based on packet communication or a public telephone network;
   means provided in the mobile telephone device for sending a signal of a demo-request toward the system server via the telephone-Internet connection service based on packet communication;
   means provided in the system server and responsive to the demo-request signal sent from the mobile telephone device for accessing the WWW server and taking out a piece of the audio-contents information from the WWW server via the Internet, the audio-contents information piece corresponding to the demo-request signal sent from the mobile telephone device; and
   means provided in the system server for converting the audio-contents information piece into an analog signal, for changing connection with the mobile telephone device from the packet-communication-based telephone-Internet connection service to the public telephone network, and for sending the analog signal toward the mobile telephone device via the public telephone network.

2. A system server comprising:
   first means for providing connection with a WWW server via the Internet, the WWW server storing information representing audio contents;
   second means for providing connection with a mobile telephone device via either a telephone-Internet connection service based on packet communication or a public telephone network;
   third means for receiving a signal of a demo-request from the mobile telephone device via the telephone-Internet connection service based on packet communication;
   fourth means responsive to the demo-request signal received by the third means for accessing the WWW server and taking out a piece of the audio-contents information from the WWW server via the Internet, the audio-contents information piece corresponding to the demo-request signal received by the third means; and
   fifth means for converting the audio-contents information piece into an analog signal, for changing the connection with the mobile telephone device from the packet-communication-based telephone-Internet connection service to the public telephone network, and for sending the analog signal toward the mobile telephone device via the public telephone network.

3. A system server as recited in claim 2, wherein the fifth means comprises 1) means for expanding the audio-contents information piece into an expanding-resultant signal, and 2) means for sending the expanding-resultant signal toward the mobile telephone device via the public telephone network.

4. A system server comprising:
   first means for providing connection with a WWW server via the Internet, the WWW server storing compressed information representing audio contents;
   second means for providing connection with a mobile telephone device via either a telephone-Internet connection service or a public telephone network;
   third means for receiving a signal of a demo-request from the mobile telephone device via the telephone-Internet connection service;
   fourth means responsive to the demo-request signal received by the third means for accessing the WWW server and taking out a piece of the audio-contents compressed information from the WWW server via the Internet, the audio-contents compressed information piece corresponding to the demo-request signal received by the third means;
   fifth means for deciding whether or not the mobile telephone device has an information expanding function on the basis of the demo-request signal received by the third means;
   sixth means for, in cases where the fifth means decides that the mobile telephone device has not the information expanding function, expanding the audio-contents compressed information piece into an expanding-resultant signal;
   seventh means for sending the expanding-resultant signal toward the mobile telephone device via the public telephone network; and
   eighth means for, in cases where the fifth means decides that the mobile telephone device has the information expanding function, sending the audio-contents compressed information piece toward the mobile telephone device via the telephone-Internet connection service.

5. In an audio-contents demo system comprising a WWW server storing information representing audio contents and a system server connectable with the WWW server via the Internet, a mobile telephone device comprising:
   first means for providing connection with the system server via either a telephone-Internet connection service based on packet communication or a public telephone network;
   second means for sending a signal of a demo-request toward the system server via the telephone-Internet connection service based on packet communication;
   third means for changing connection with the system server from the packet-communication-based telephone-Internet connection service to the public telephone network, and for receiving an analog signal of audio contents from the system server via the public telephone network, the audio-contents signal being responsive to the demo-request signal; and
   fourth means for playing back the audio contents represented by the analog signal received by the third means.

6. An audio-contents demo system comprising:
  a WWW server storing information representing audio contents;
  a system server connectable with the WWW server via the Internet;
  a mobile telephone device connectable with the system server via either a telephone-Internet connection service or a public telephone network;
  means provided in the mobile telephone device for sending a signal of a demo-request and an ID signal toward the system server via the telephone-Internet connection service, the ID signal being assigned to the mobile telephone device;
  means provided in the system server for storing registered ID signals;
  means provided in the system server for deciding whether or not the ID signal sent from the mobile telephone device is equal to one of the registered ID signals;
  means provided in the system server and responsive to the demo-request signal sent from the mobile telephone device for, only in cases where the ID signal sent from the mobile telephone device is equal to one of the registered ID signals, accessing the WWW server and taking out a piece of the audio-contents information from the WWW server via the Internet, the audio-contents information piece corresponding to the demo-request signal sent from the mobile telephone device;
  means provided in the system server for filtering the audio-contents information piece into a filtering-resultant signal according to a filtering characteristic determined by the ID signal sent from the mobile telephone device; and
  means provided in the system server for sending the filtering-resultant signal toward the mobile telephone device via the public telephone network.

7. An audio-contents demo system as recited in claim 6, further comprising means provided in the system server for performing authentication with respect to the mobile telephone device in response to the ID signal sent therefrom.

8. A system server comprising:
  first means for providing connection with a WWW server via the Internet, the WWW server storing information representing audio contents;
  second means for providing connection with a mobile telephone device via either a telephone-Internet connection service based on packet communication or a public telephone network;
  third means for receiving a signal of a demo-request and an ID signal from the mobile telephone device via the telephone-Internet connection service based on packet communication, the ID signal being assigned to the mobile telephone device;
  fourth means for storing registered ID signals;
  fifth means for deciding whether or not the ID signal received by the third means is equal to one of the registered ID signals stored by the fourth means;
  sixth means responsive to the demo-request signal received by the third means for, only in cases where the fifth means decides that the ID signal received by the third means is equal to one of the registered ID signals stored by the fourth means, accessing the WWW server and taking out a piece of the audio-contents information from the WWW server via the Internet, the audio-contents information piece corresponding to the demo-request signal received by the third means; and
  seventh means for changing connection with the mobile telephone device from the packet-communication-based telephone-Internet connection service to the public telephone network, for converting the audio-contents information into an analog signal, and for sending the analog signal toward the mobile telephone device via the public telephone network.

9. A system server as recited in claim 8, wherein the seventh means comprises 1) means for expanding the audio-contents information piece into an expanding-resultant signal, 2) means for filtering the expanding-resultant signal into a filtering-resultant signal according to a filtering characteristic determined by the ID signal received by the third means, and 3) means for sending the filtering-resultant signal toward the mobile telephone device via the public telephone network.

10. A system server comprising:
  first means for providing connection with a WWW server via the Internet, the WWW server storing compressed information representing audio contents;
  second means for providing connection with a mobile telephone device via either a telephone-Internet connection service or a public telephone network;
  third means for receiving a signal of a demo-request and an ID signal from the mobile telephone device via the telephone-Internet connection service, the ID signal being assigned to the mobile telephone device;
  fourth means for storing registered ID signals;
  fifth means for deciding whether or not the ID signal received by the third means is equal to one of the registered ID signals stored by the fourth means;
  sixth means responsive to the demo-request signal received by the third means for, only in cases where the fifth means decides that the ID signal received by the third means is equal to one of the registered ID signals stored by the fourth means, accessing the WWW server and taking out a piece of the audio-contents compressed information from the WWW server via the Internet, the audio-contents compressed information piece corresponding to the demo-request signal received by the third means;
  seventh means for deciding whether or not the mobile telephone device has an information expanding function on the basis of the ID signal received by the third means;
  eighth means for, in cases where the seventh means decides that the mobile telephone device has not the information expanding function, expanding the audio-contents compressed information piece into an expanding-resultant signal;
  ninth means for sending the expanding-resultant signal toward the mobile telephone device via the public telephone network; and
  tenth means for, in cases where the seventh means decides that the mobile telephone device has the information expanding function, sending the audio-contents compressed information piece toward the mobile telephone device via the telephone-Internet connection service.

11. An audio-contents demo system comprising:
  a WWW server storing information representing audio contents;
  a system server connectable with the WWW server via the Internet;
  a mobile telephone device connectable with the system server via either a telephone-Internet connection service based on packet communication or a public telephone network;

means provided in the mobile telephone device for sending a signal of a demo-request and an ID signal toward the system server via the telephone-Internet connection service based on packet communication, the ID signal being assigned to the mobile telephone device;

means provided in the system server for storing registered ID signals;

means provided in the system server for deciding whether or not the ID signal sent from the mobile telephone device is equal to one of the registered ID signals;

means provided in the system server and responsive to the demo-request signal sent from the mobile telephone device for, only in cases where the ID signal sent from the mobile telephone device is equal to one of the registered ID signals, accessing the WWW server and taking out a piece of the audio-contents information from the WWW server via the Internet, the audio-contents information piece corresponding to the demo-request signal sent from the mobile telephone device; and means provided in the system server for changing connection with the mobile telephone device from the packet-communication based telephone-Internet connection service to the public telephone service, and for sending a signal of a telephone number toward the mobile telephone device via the public telephone network, the telephone number corresponding to the audio-contents information piece.

12. A system server comprising:

first means for providing connection with a WWW server via the Internet, the WWW server storing compressed information representing audio contents;

second means for providing connection with a mobile telephone device via either a telephone-Internet connection service or a public telephone network;

third means for receiving a signal of a demo-request and an ID signal from the mobile telephone device via the telephone-Internet connection service, the ID signal being assigned to the mobile telephone device;

fourth means for storing registered ID signals;

fifth means for deciding whether or not the ID signal received by the third means is equal to one of the registered ID signals stored by the fourth means;

sixth means responsive to the demo-request signal received by the third means for, only in cases where the fifth means decides that the ID signal received by the third means is equal to one of the registered ID signals stored by the fourth means, accessing the WWW server and taking out a piece of the audio-contents compressed information from the WWW server via the Internet, the audio-contents compressed information piece corresponding to the demo-request signal received by the third means;

seventh means for deciding whether or not the mobile telephone device has an information expanding function on the basis of the ID signal received by the third means;

eighth means for, in cases where the seventh means decides that the mobile telephone device has not the information expanding function, sending a signal of a telephone number toward the mobile telephone device via the public telephone network, the telephone number corresponding to the audio-contents compressed information piece; and ninth means for, in cases where the seventh means decides that the mobile telephone device has the information expanding function, sending the audio-contents compressed information piece toward the mobile telephone device via the telephone-Internet connection service.

* * * * *